Oct. 15, 1957 L. HEIDMANN 2,809,602
MACHINE FOR SETTING AND MOLDING CONTAINERS
Filed Dec. 24, 1952
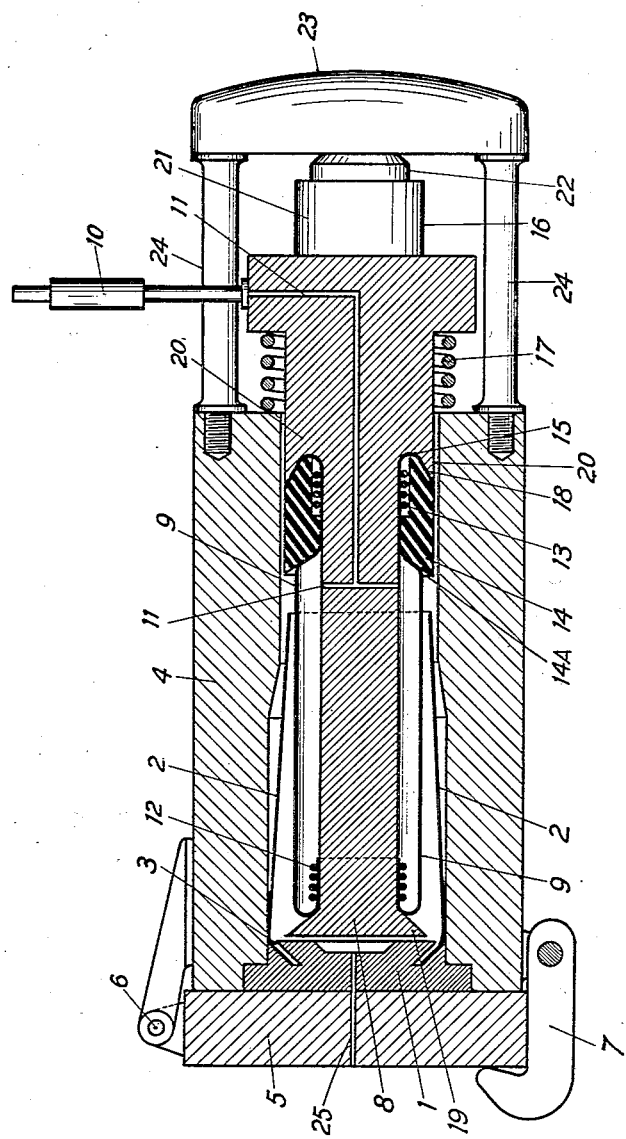
Inventor
Leon Heidmann
By Robert E. Burns
Attorney

ର୍ଯ୍ୟ
2,809,602
MACHINE FOR SETTING AND MOLDING CONTAINERS

Leon Heidmann, Paris, France, assignor to Forges et Ateliers de Constructions Electriques de Jeumont, Paris, France, a corporation of France Application December 24, 1952, Serial No. 327,758

Claims priority, application France July 16, 1952

6 Claims. (Cl. 113—44)

The present invention relates to apparatus for use in manufacturing containers of the type that comprises a base and an approximately cylindrical side wall portion which is set in a groove in the base.

In manufacturing containers of this type, the upper face of the base is provided with a circular groove which is preferably inclined to the vertical axis of the base. The lower edge of the approximately cylindrical side wall is inserted in this groove and the material of the base adjacent the groove is then submitted to sufficient pressure to crowd in the sides of the groove and thus "set" or lock the edge of the side wall in place. The container thus formed is then inserted in a mold and is subjected to high internal pressure to make the walls of the container conform to the mold, thereby shaping and sizing it to exact dimensions.

Heretofore, the setting and final molding operations have been carried out successively on separate machines. An object of the present invention is to perform both operations on the same machine and to facilitate and accelerate this two-fold job. A further object of the invention is to expel the finished article quickly and easily after the final molding operation.

In accordance with the invention, the machine comprises a mold, a setting and expelling piston which is movable relative to the mold in an axial direction, and an expandable bladder or vessel which surrounds the piston and, after operation of the piston to perform the setting operation, is expanded by high internal pressure to press the side walls of the container into conformity with the mold. The piston is also operative to expel the completed container from the mold. A feature of the machine is that pinching or jamming of the pressure-applying expandable bladder is prevented.

The objects and advantages of the invention will be more fully understood by referring to the accompanying drawing which is a longitudinal section of a machine embodying the invention.

As illustrated by way of example in the drawing, the container comprises a base 1 and an approximately cylindrical section 2. The section 2 is illustrated as being somewhat tapered so that it is of frusto-conical form and its lower end is freely inserted in a circular groove or channel provided in the upper face of the base 1. The channel 3 is shown as being inclined inwardly toward the axis of the base. The combined machine which is to be described is designed to effect the solid setting of the end of the side wall section in the channel 3 and then to submit the whole container to a high internal pressure in order to make it conform to the mold and thereby give it its final size and shape.

The machine shown by way of example in the drawings comprises a mold 4 into which the container parts 1 and 2 are inserted. One end of the mold is closed by a cylinder head 5 which is shown as being pivoted at 6 so that it can be opened and closed. Appropriate locking means, shown schematically as a latch 7, is provided for locking the cylinder head 5 in closed position.

A rigid setting piston 8 projects into the mold 4 from the end opposite the cylinder head 5. At its end, the piston 8 has an enlarged head portion 19 which is adapted to engage the upper face of the container base 1 just inside the circular groove 3. The piston 8 is surrounded by a flexible molding vessel or bladder 9 the interior of which is connected by conduits 11 to a source of high fluid pressure 10 which may have the form of a compression cylinder which is constructed and controlled, for example, in accordance with my copending application Serial No. 643,762, filed March 4, 1957.

The bladder 9 comprises an approximately cylindrical section of flexible and somewhat elastic material, such, for example, as rubber with or without internal reinforcing. The ends of the bladder 9 are secured to the piston in an airtight manner by means of bands 12 and 13. The band 12 is placed inside the bladder and clamps an inturned end portion of the bladder to the piston. The band 13 is placed outside the bladder and is surrounded by a collar 14 which is preferably made of relatively hard rubber. The outside of this collar is slightly smaller than the bore of the mold 4 so as to fit freely into the mold. The right hand end of the collar 14, as viewed in the drawings, seats in a circular groove 15 which is provided in a guide shoulder 20 of the piston 8. The shape of the groove 15 is such that its outer edge 18 is thin and relatively flexible so that it can be pressed into engagement with the mold 4 through elastic deformation. The left hand end 14a of the rubber collar 14 is preferably cupped or dished, as shown.

The hardness of the elastic material of this collar must be sufficient to prevent its penetration between the mold 4 and the edge 18.

Suitable means is provided for moving the piston 8 relative to the mold 4. In the embodiment illustrated in the drawings, a hydraulic jack 16 comprising a cylinder 21 and a piston 22 acts between one end of the setting piston 8 and a yoke 23 connected to the mold 4 by studs 24. When the hydraulic jack is actuated, the mold 4 is moved toward the right relative to the setting piston 8. It is returned in the opposite direction by a compression spring 17 acting between an end of the mold and a shoulder on the setting piston.

The machine described above can be operated, for example, in the following manner. The container parts 1 and 2 are put in place in the mold and the cylinder head 5 is closed and locked by the latch 7. The bladder-like vessel 9 is then inflated with a preparatory pressure so that the bladder is pressed against the internal surfaces of the container 1, 2 to expel enclosed air which escapes through a passageway 25. The mold 4 is next moved toward the right by means of the hydraulic jack 16. This results in the setting piston 8 pressing the base of the container between the head 19 of the piston and the cylinder head 5 to flatten the circular channel 3 and thereby assure the tight setting of the wall section 2 in the base 1. It will be noted that the central portion of the base is recessed so that the pressure of the piston is concentrated on an annular portion of material adjacent the circular channel 3. Conversely, the recess could be formed in the face of the piston head 19. After the setting operation, the liquid pressure inside the bladder 9 is greatly increased. This high internal pressure accomplishes the final molding of the container 1, 2 by making it conform entirely with the mold 4.

It should be noted that, during this final molding operation under extremely high pressure, the flexible bladder-like vessel 9 cannot be forced between the base 1 and the piston 8 and thereby pinched since the piston continues to be pressed without any clearance against the base 1 which is firmly held by the cylinder head 5. At its other end, the bladder-like vessel 9 strongly compresses the elastic collar 14 in a longitudinal direction and thereby expands the collar radially so that it is pressed tightly against the mold 4 and into the groove 15 in such a way that the flexible edge 18 of this groove is slightly expanded and is pressed in turn with great force against the mold 4. The result of this is that the vessel 9 cannot be pinched between the collar 14 and the mold 4 and all play is eliminated between the edge 18 and the mold 4 so that the elastic material of the collar 14 cannot be forced between the mold and the guiding shoulder 20 of the piston. It will thus be seen that all danger of jamming is eliminated in spite of the very high internal pressure that is employed.

By relieving the pressure in the bladder 9 to permit the latter to contract and by also relieving the pressure of the hydraulic jack 16, the mold 4 is moved axially to the left relative to the setting piston 8 by means of the compression spring 17. The cylinder head 5 is opened and the container 1, 2 which has been thus set and molded is extracted. To facilitate and accelerate this extraction, the operator can again actuate the hydraulic jack 16 so that the piston 8 expels the finished container from the mold.

It will be seen that the combined machine in accordance with the invention rapidly accomplishes the two operations of setting and molding the containers, that risks of jamming or excessive wear because of undesirable penetration of the elastic elements between various parts of the machine are eliminated, and that rapid expulsion of the finished product from the machine is easily accomplished. At the same time, the machine offers the advantages of a constantly correct distribution of useful pressures and of the utilization of liquids which do not come into contact with the outside air. It will be understood that the machine herein shown and described by way of example may be modified in various ways without departing from the scope and spirit of the invention. In particular, the setting piston can be moved instead of moving the mold.

What I claim and desire to secure by Letters Patent is:

1. In a machine for setting and molding a container comprising a base with a circular groove and an approximately cylindrical side wall portion having an end in said groove, an approximately cylindrical mold, a movable cylinder head for closing one end of the mold, means for releasably securing the cylinder head in closed position, a setting piston projecting into said mold and into a container positioned in said mold from the end opposite said head, said setting piston having an enlarged free end portion and a guide shoulder at the opposite end, means for moving the piston axially relative to the mold to apply pressure to said base between said free end of the piston and the cylinder head and thereby close in said groove to grip the end of said side wall portion, a flexible bladder circumferentially surrounding said setting piston while leaving said end free and means for supplying fluid under pressure to expand said bladder and thereby press the side wall portion of the container whereby the molding of the container is effected after the setting of its side wall in the circular groove.

2. In a machine for setting and molding a container having a base with a circular groove and an approximately cylindrical side wall portion having an end in said groove, an approximately cylindrical mold, a movable cylinder head for closing one end of the mold, a setting piston projecting into said mold from the end opposite said head, said piston having an enlarged free end portion inside the mold, means for moving the piston axially relatively to the mold to press the base of said container between the free end of the piston and said head and thereby close in said groove to grip the end of said side wall portion, an expansible bladder circumferentially surrounding said setting piston while leaving said end free and means for supplying fluid under pressure to expand said bladder and thereby press the side wall portion of the container into conformity with said mold and a guide shoulder on said piston engaging said mold opposite said free end, said shoulder having a thin flexible edge surrounding an end of said bladder and close to said mold to avoid the bladder being pinched between said shoulder and the mold.

3. In a machine for successively setting and molding a container having a base with a circular groove and an approximately cylindrical side wall portion having an end in said groove, an approximately cylindrical mold, a movable cylinder head closing one end of the mold, a rigid setting piston having a guiding shoulder fitting into the end of the mold opposite said head and a reduced portion projecting into the mold and a container positioned in said mold, said reduced portion having an enlarged end portion adjacent said head, said guiding shoulder having its lower surface hollowed out thereby to render its peripheral edge flexible, means for moving the piston axially relative to the mold to press the base of said container between said end portion of the piston and said head and thereby close in said groove to grip the end of said side wall portion, an approximately cylindrical bladder circumferentially surrounding the reduced portion of the piston, an exterior band surrounding the end of the bladder adjacent said shoulder to bind the bladder to the piston, the opposite end of the bladder being turned in under, a band inside the bladder binding the inturned end of the bladder to the piston, an elastic collar surrounding said exterior band and projecting into said guiding shoulder hollowed out portion and fitting freely into the mold, and means for supplying fluid under pressure to expand said bladder and thereby press the side wall of the container into conformity with the mold.

4. A machine according to claim 3, in which said elastic collar surrounding said exterior band has a dished edge directed toward the container and is disposed close to said mold to avoid the bladder being pinched between the mold and said shoulder.

5. In a machine for successively setting and molding a container having a base with a circular groove and an approximately cylindrical side wall portion having an end in said groove, an approximately cylindrical mold, a movable cylinder head closing one end of the mold, a rigid setting piston having a guiding shoulder fitting into the end of the mold opposite said head and having a reduced portion projecting into the mold toward said head, said reduced portion having an enlarged end portion at the end opposite the shoulder and a container positioned in said mold, and means for moving the piston axially relative to the mold to press the base of said container between said end portion of the piston and said head to thereby press in said groove to grip the end of said side wall portion, an approximately cylindrical bladder circumferentially surrounding the reduced portion of the piston while leaving said end free, an exterior band surrounding the end of the bladder adjacent said shoulder to bind the bladder to the piston, a band binding the opposite end of the bladder to the piston, means for supplying fluid under pressure to the inside of the bladder to expand it and thereby press the side wall portion of the container into conformity with the mold, a hard rubber collar surrounding said exterior band and having a lip directed toward the bladder and close to the mold to avoid the bladder being pinched between the piston and mold when the bladder is expanded.

6. In a machine for successively setting and molding a container having a base with a circular groove and an approximately cylindrical side wall portion having an end in said groove, an approximately cylindrical mold, a movable cylinder head for opening and closing one end of the mold, means mounting said cylinder head on said cylinder for movement between open and closed positions and releasably securing said head in closed position, a setting piston projecting into said mold from the end opposite said head, a hydraulic jack for moving said piston axially relatively to said mold to press the base between the end of the piston and the said head to press in said groove to grip the end of said side wall portion, resilient means for moving said piston in the opposite direction relative to the mold, an expansible bladder surrounding said piston and means for supplying fluid under pressure to expand the bladder and thereby press the side wall portion of the container into conformity with said mold, said hydraulic jack having a stroke sufficient to force the piston to eject the container from the mold when the head is open.

References Cited in the file of this patent

UNITED STATES PATENTS

| | | |
|---|---|---|
| 464,737 | Stapley | Dec. 8, 1891 |
| 1,533,115 | Hulbert | Apr. 14, 1925 |
| 1,753,680 | Batie | Apr. 8, 1930 |
| 1,930,745 | Fisher | Oct. 17, 1933 |
| 2,066,085 | Whistler | Dec. 29, 1936 |
| 2,132,002 | Hight | Oct. 4, 1938 |
| 2,298,132 | Johnson | Oct. 6, 1942 |
| 2,354,564 | Wiley | July 25, 1944 |
| 2,375,599 | Walton | May 8, 1945 |
| 2,426,289 | Wallace et al. | Aug. 26, 1947 |
| 2,450,580 | Conzelman | Oct. 5, 1948 |

FOREIGN PATENTS

| | | |
|---|---|---|
| 523,948 | Great Britain | July 25, 1940 |

OTHER REFERENCES

Watts: Abstract of applications Serial Number 131,759, published October 28, 1952, 663 O. G. 1223, class 113, sub. 44.